United States Patent [19]
Cohen

[11] Patent Number: 6,067,539
[45] Date of Patent: May 23, 2000

[54] INTELLIGENT INFORMATION RETRIEVAL SYSTEM

[75] Inventor: Gideon David Cohen, Mazor, Israel

[73] Assignee: Vigil, Inc., Ramat-Gan, Israel

[21] Appl. No.: 09/033,516

[22] Filed: Mar. 2, 1998

[51] Int. Cl.[7] ................................. G06F 17/30
[52] U.S. Cl. .................. 707/2; 707/3; 707/4; 707/6; 345/968
[58] Field of Search ................ 707/4, 2, 6, 3, 707/10, 104, 9; 704/270, 271, 275; 345/333, 968, 978, 329; 382/232

[56] References Cited

U.S. PATENT DOCUMENTS

| | | | |
|---|---|---|---|
| 5,321,833 | 6/1994 | Chang et al. ........................... | 707/5 |
| 5,390,281 | 2/1995 | Luciw et al. .......................... | 706/11 |
| 5,477,447 | 12/1995 | Luciw et al. .......................... | 704/9 |
| 5,504,837 | 4/1996 | Griffeth et al. ........................ | 706/10 |
| 5,539,659 | 7/1996 | McKee et al. ......................... | 395/200 |
| 5,544,049 | 8/1996 | Henderson et al. .................... | 704/7 |
| 5,546,506 | 8/1996 | Araki et al. ........................... | 706/61 |
| 5,577,241 | 11/1996 | Spencer ................................. | 707/5 |
| 5,659,732 | 8/1997 | Kirsch .................................... | 707/5 |
| 5,675,819 | 10/1997 | Schuetze ................................ | 704/10 |
| 5,694,525 | 12/1997 | Yamashita .............................. | 706/52 |
| 5,784,608 | 7/1998 | Meske, Jr. et al. ..................... | 707/2 |
| 5,796,393 | 8/1998 | MacNaughton et al. ............... | 345/329 |
| 5,852,820 | 12/1998 | Burrows ................................. | 707/2 |
| 5,862,260 | 1/1999 | Rhoads ................................... | 382/232 |
| 5,884,262 | 3/1999 | Wise et al. ............................. | 704/270 |
| 5,890,152 | 3/1999 | Rapaport et al. ...................... | 707/6 |

*Primary Examiner*—Wayne Amsbury
*Assistant Examiner*—Thu-Thao Havan
*Attorney, Agent, or Firm*—David J. Weitz; Wilson Soneini Goodrich & Rosati

[57] ABSTRACT

A system for retrieving information related to a topic of interest, comprising: (a) a finder for finding a location of a computerized source of information, the information being divided into at least one message, such that the source of information is a located source of information, the finder being a self-operated software program; (b) a source repository for storing the location of the located source of information; (c) a sampler for sampling the located source of information by retrieving the at least one message from the located source of information, such that the at least one message is a retrieved message, the sampler being a self-operated software program; (d) a matcher for determining a matching score for the retrieved message, the matcher being a self-operated software program; and (e) a message repository for storing the retrieved message and the matching score.

33 Claims, 5 Drawing Sheets

Finder task

Sampler Task

INTELLIGENT INFORMATION RETRIEVAL SYSTEM

FIELD AND BACKGROUND OF THE INVENTION

The present invention relates to a system and method for intelligent retrieval of information, and more particularly to a system and method for selecting the most relevant source or sources of information on a given topic.

With the advent of computers, and in particular of computer networks such as the Internet and the World Wide Web, vast quantities of information have become instantly accessible to the user. These huge amounts of information come in many forms including textual data, image data, video streams, an audio format or sound streams and combinations thereof. Furthermore, information is now available on substantially any topic. However, the drawback of such accessibility is the increasing difficulty of actually finding information on the desired topic, and separating such desired information from the large amounts of information which are not of interest. Thus, information retrieval has actually become more complicated, particularly with regard to locating sources of information relevant to the topic of interest.

Previous attempts have been disclosed in the prior art for increasing the efficiency of information retrieval. Generally, these attempts have centered upon methods for ranking the relevancy of retrieved information according to the frequency of keywords. For example, U.S. Pat. No. 5,321,833 to Chang et al. discloses a method for quantifying the relevance of retrieved information according to the weighted frequency of appearance of query terms in the retrieved information. The weighting function incorporates such factors as the distance between query terms in the retrieved information. However, all of these prior art methods, of which a relatively complex example is disclosed in U.S. Pat. No. 5,321,833, suffer from the limitation of only ranking information after it has been retrieved. Such an approach is suitable only if the source of information is itself highly relevant, for example a database of information for the topic of interest. However, if information is being retrieved from multiple sources, such as Web sites on the World Wide Web (WWW), such a method for ranking retrieved information is not as useful. Thus, prior art methods for ranking retrieved information alone are lacking for information retrieval from multiple sources of unknown quality or relevance.

A more useful method would sample portions of information from multiple sources of information, and would then use the sampled information to determine the relevancy of the information source. The multiple sources could then be ranked, so that sources of most interest would be more highly ranked. Such ranking could then be used to determine patterns for searching for information of interest, for accessing the sources of information or for ranking the retrieved information, for example. Such a method would not be restricted to ranking information after it had been retrieved, and would therefore enable the information sources themselves to be evaluated. Unfortunately, such a method is neither taught nor suggested by the prior art.

There is therefore a need for, and it would be useful to have, a method and a system for both ranking retrieved information on a topic of interest, and for determining the relevancy of sources of information for the topic of interest, which would rank both the retrieved information and these sources according to the topic of interest, and which would incorporate user feedback into the ranking functions, thereby increasing the efficiency of information search and retrieval.

SUMMARY OF THE INVENTION

According to the present invention, there is provided a system for retrieving information related to a topic of interest, comprising: (a) a finder for finding a location of a computerized source of information, the information being divided into at least one message, such that the source of information is a located source of information, the finder being a self-operated software program; (b) a source repository for storing the location of the located source of information; (c) a sampler for sampling the located source of information by retrieving the at least one message from the located source of information, such that the at least one message is a retrieved message, the sampler being a self-operated software program; (d) a matcher for determining a matching score for the retrieved message, the matcher being a self-operated software program; and (e) a message repository for storing the retrieved message and the matching score.

Preferably, the sampler samples only one located source of information, such that the sampler is a dedicated sampler. Preferably, the finder finds the location according to a reference in a previously retrieved message. Alternatively and preferably, the finder finds the location according to a located source of a related topic of interest. Preferably, the finder calculates a rating for the located source of information, the rating being calculated according to the matching score of the at least one message. More preferably, the rating is stored in the source repository.

According to another preferred embodiment of the present invention, the sampler resamples the located source of information by looking for a new message from the located source of information, such that if the new message is present, the new message is retrieved from the located source of information. Alternatively and preferably, said new message is an updated version of a previous retrieved message. Preferably, the sampler determines a rate of change for the located source of information according to whether the new message is present. More preferably, the sampler determines the rate of change for the located source of information according to a creation time of at least one message in the located source of information. Most preferably, the rate of change is stored in the source repository.

According to yet another preferred embodiment of the present invention, the matcher determines the matching score for the retrieved message according to at least one parameter of the retrieved message. Preferably, the at least one parameter is a keyword related to the topic of interest. Also preferably, at least one parameter is weighted according to a weighting function. More preferably, the matching score is adjusted by comparing the at least one parameter of the retrieved message to a parameter of a previously retrieved message, such that if the at least one parameter of the retrieved message has a correlation to the parameter of the previously retrieved message, the matching score of the retrieved message is adjusted according to a matching score of the previously retrieved message. Most preferably, the matching score of the previously retrieved message includes a rating obtained from a user feedback for the previously retrieved message. Also most preferably, the matching score for the retrieved message is adjusted according to the rating for the previously retrieved message substantially after the retrieved message is stored in the message repository.

Preferably, the matching score of the retrieved message includes a relevancy score and a credibility score, the relevancy score being calculated according to a keyword related to the topic of interest, and the credibility score being calculated according to the user feedback. More preferably, the retrieved message is stored in the source repository substantially only the relevancy score is above a minimum relevancy threshold and the credibility score is above a minimum credibility threshold.

According to another embodiment of the present invention, there is provided a method for rating information retrieved from a computerized source of information, the method comprising the steps of: (a) locating the computerized source of information; (b) retrieving a portion of information from the computerized source of information, the portion being in a form of a retrieved message; (c) calculating a matching score for the retrieved message according to at least one parameter of the retrieved message, such that the retrieved message is rated according to the matching score; and (d) adjusting the matching score according to a previous matching score for at least one previously retrieved message if the at least one parameter of the retrieved message correlates with at least one parameter of the previously retrieved message. Of course, the matching score could also be adjusted according to the matching scores for a plurality of previously retrieved messages.

Preferably, the method further comprises the step of: (e) storing the retrieved message substantially only if the matching score is above a minimum threshold. Also preferably, the previously retrieved message is examined by a user, and the step of adjusting the matching score includes the steps of: (i) receiving a rating of the previously retrieved message from the user; and (ii) adjusting the previous matching score according to the rating.

Also preferably, the matching score of the retrieved message includes a relevancy score and a credibility score, the relevancy score being calculated according to a relevancy feature selected from the group consisting of a linguistic comparison between the retrieved message and the topic of interest, a user feedback and a combination of the linguistic comparison and the user feedback, and the credibility score being calculated according to the matching score of the previously retrieved message, and the retrieved message is stored in the source repository substantially only if the relevancy score is above a minimum relevancy threshold and the credibility score is above a minimum credibility threshold.

Alternatively and preferably, the method further comprises the step of: (e) calculating a source rating for the computerized source of information, the source rating being calculated according to the matching score for the at least one retrieved message. More preferably, a plurality of matching scores is obtained for a plurality of messages, and the source rating is calculated according to a number of messages having a matching score above a minimum threshold. Most preferably, the source rating is calculated according to a ratio of the number of messages having a matching score above a minimum threshold to a total number of messages.

According to yet another embodiment of the present invention, there is provided a method for rating information retrieved from a computerized source of information, the method comprising the steps of: (a) locating the computerized source of information; (b) retrieving a portion of information from the computerized source of information, the portion being in a form of a retrieved message; (c) calculating a matching score for the retrieved message according to at least one parameter of the retrieved message, such that the retrieved message is rated according to the matching score; and (d) calculating a source rating for the computerized source of information, the source rating being calculated according to the matching score for the at least one retrieved message.

Hereinafter, the term "network" refers to a connection between any two computers which permits the transmission of data. Hereinafter, the term "Web site" refers to a location featuring at least one Web page. Hereinafter, the term "Web page" refers to a file or files written in a document mark-up language, which are accessible through a software program capable of interpreting a document mark-up language such as HTML (Hypertext Mark-up Language) or VRML (Virtual Reality Modelling Language). Examples of such software programs include, but are not limited to, Netscape™ or Microsoft™ Explorer™.

Hereinafter, the term "computer" refers to any electronic device capable of storing or retrieving information including, but not limited to, personal computers (PC) having an operating system such as DOS, Windows™, OS/2™ or Linux; Mackintosh™ computers; computers having JAVA™-OS as the operating system; and graphical workstations such as the computers of Sun Microsystems ™ and Silicon Graphics™, and other computers having some version of the UNIX operating system such as SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the term "self-operated software" refers to a software program, a program thread, or an agent, which is capable of substantially automatically performing at least one finction, substantially without constant supervision by a computer user. The self-operated software is preferably able to interact with at least one other software program. More preferably, the self-operated software is able to accept information or a command from the computer user, and to adjust the behavior of the at least one function accordingly.

Hereinafter, the term "computerized source of information" refers to any source of information accessible by or through a computer, or by or through a software program being operated by that computer. Hereinafter, the term "topic" includes, but is not limited to, a structured query such as that written in SQL, at least one keyword, an image, or any form of the definition of an information goal which is desired by the user. Hereinafter, the term "source" includes, but is not limited to, a flat file, a Web page, a Web site, an ftp site, a news group, a proprietary source, a push channel or any off-line source. Hereinafter, the format of a message includes, but is not limited to, text, HTML, VRML, an image, a video clip or a video stream or any other MIME format.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF PREFERRED EMBODIMENTS

The system and method of the present invention are drawn toward the intelligent gathering of information on at least one topic of interest from multiple sources. Typically, information will be gathered on many such topics of interest substantially simultaneously. Samples of information are analyzed from each source, and the analysis is used to rank the retrieved information according to the relevancy of the sampled information to the topic of interest. The source itself can then preferably be ranked according to the rank of the retrieved information.

The principles and operation of a method and a system for ranking retrieved information and sources of information according to the present invention may be better understood with reference to the drawings and the accompanying description, it being understood that these drawings are given for illustrative purposes only and are not meant to be limiting.

Figure 1:
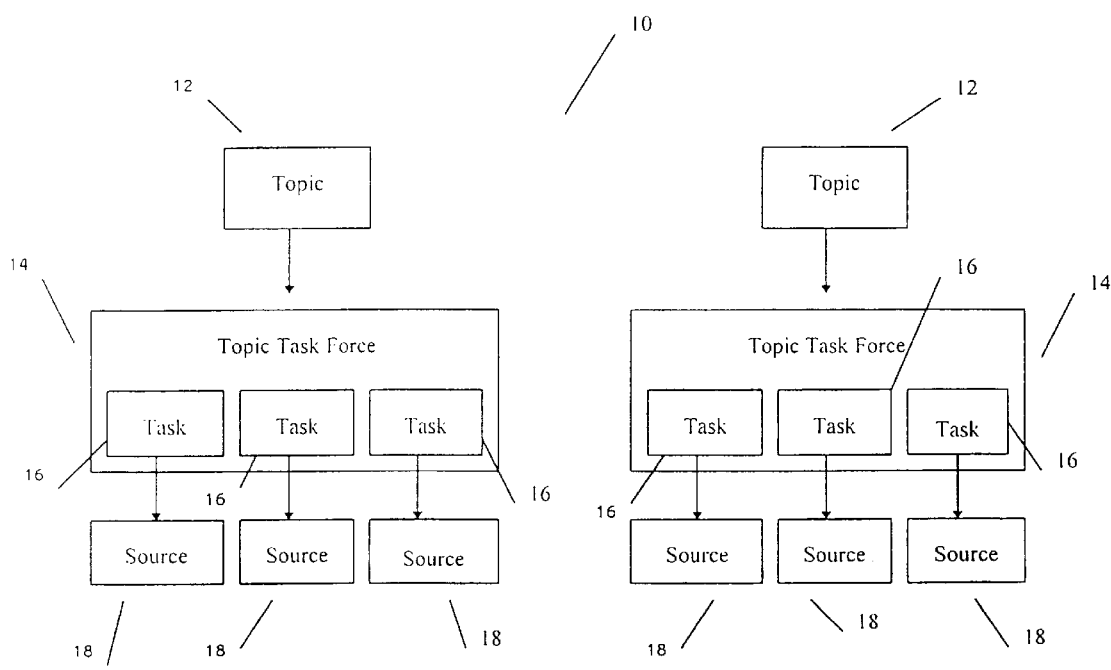
FIG. 1 is a schematic illustration of an exemplary system for information retrieval according to the present invention.

Referring now to the drawings, FIG. 1 depicts a schematic illustration of an exemplary system for information retrieval according to the present invention. A system for information retrieval 10 is capable of retrieving information related to at least one topic 12, of which two are shown for the purposes of illustration without any intention of being limiting. Each topic 12 is then given to a topic task force 14. Topic task force 14 includes at least one, but preferably a plurality of, tasks 16. Each task 16 is a self-operated software program which performs at least one function related to the retrieval of information according to topic 12. For example, task 16 might retrieve a sample of information from a source 18. Tasks 16 could be operated on a remote host or hosts with an on-line or off-line connection to system 10. Topic task force 14 manages tasks 16 for the efficient retrieval of information from source 18, for the ranking of the retrieved information, and preferably for the ranking of each source 18 according to the relevance of the retrieved information.

Figure 2:
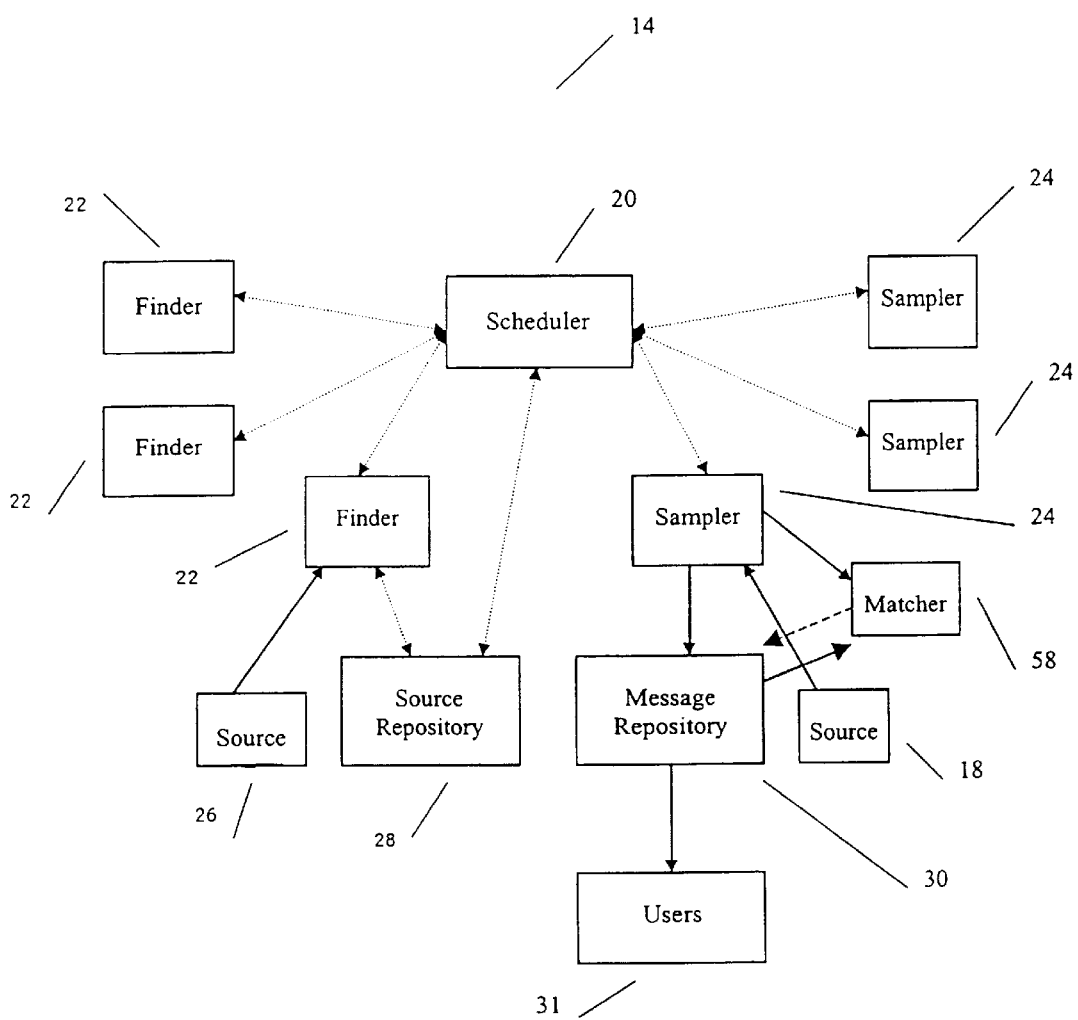
FIG. 2 is a schematic illustration of the topic task force of FIG. 1 according to the present invention.

FIG. 2 is a schematic illustration, showing more detail, of the topic task force of FIG. 1 according to the present invention. Topic task force 14 features a scheduler 20, which is a self-operated software program for providing overall control of the remaining tasks 16. Scheduler 20 controls the function of at least one, but preferably a plurality of, finders 22 and samplers 24, which are also examples of tasks 16. Upon activation, each finder 22 locates at least one new source 26. Each new source 26 is then added to a source repository 28. Source repository 28 could be in any convenient format including, but not limited to, a flat file or a group of flat files, or a relational database.

Source repository 28 stores the location of sources 18. For example, if source 18 is a Web site, accessible through a software program capable of interpreting a document mark-up language such as HTML or VRML, then the location of source 18 would be the URL (Universal Resource Location) of that Web site. As another example, if source 18 was a flat file stored on a hard disk, the location of source 18 would include the directory and file name of that flat file, as well as the network address of the computer operating the hard disk if necessary. Thus, the location of source 18 is the information required to enable the components of topic task force 14 to locate and access source 18.

Preferably, source repository 28 also stores such information as the times of the first and of the most recent sampling of sources 18, the threshold of relevancy which any source 18 must meet to be considered relevant, an adaptive scoring function to determine that relevancy, and the relevancy rating of each source 18. Also preferably, source repository 28 stores the relevancy rating for each message, as described in further detail below. In addition, more preferably source repository 28 includes the typical rate of alteration of each source 18. One advantage of the electronic storage and manipulation of information is that such information is easily alterable. As a consequence, the information stored in each source 18 could change. Certain types of information, such as archived information, usually change relatively slowly, while other types of information, such as Web sites, may change quite rapidly. Observation of each source 18 enables topic task force 14 to determine the typical rate of change of source 18, which can then preferably be stored in source repository 28.

Once each new source of information 26 is stored in source repository 28, sampler 24 then samples new source of information 26, as well as resamples any previously sampled sources of information 18 for new messages. A message is simply a unit of information gathered from any source 18, so that a new message would be new information which had not been previously sampled. Optionally, the new message could be an updated version of a previously retrieved message. In the case of new source of information 26, all of the information is new, so that all messages are new. The unit is determined according to any convenient portion of information. For example, if source 18 is a Web site, the message unit could be a Web page. Sampler 24 then stores the retrieved message in a message repository 30, where the message can be accessed by a user 31. Preferably, the message could also be accessed by other software programs or by other components of system 10. Preferably, sampler 24 samples only one source of information 26, such that sampler 24 is a dedicated sampler. In this preferred case, upon locating any new source of information 26, a new sampler 24 must be created.

Figure 3A:
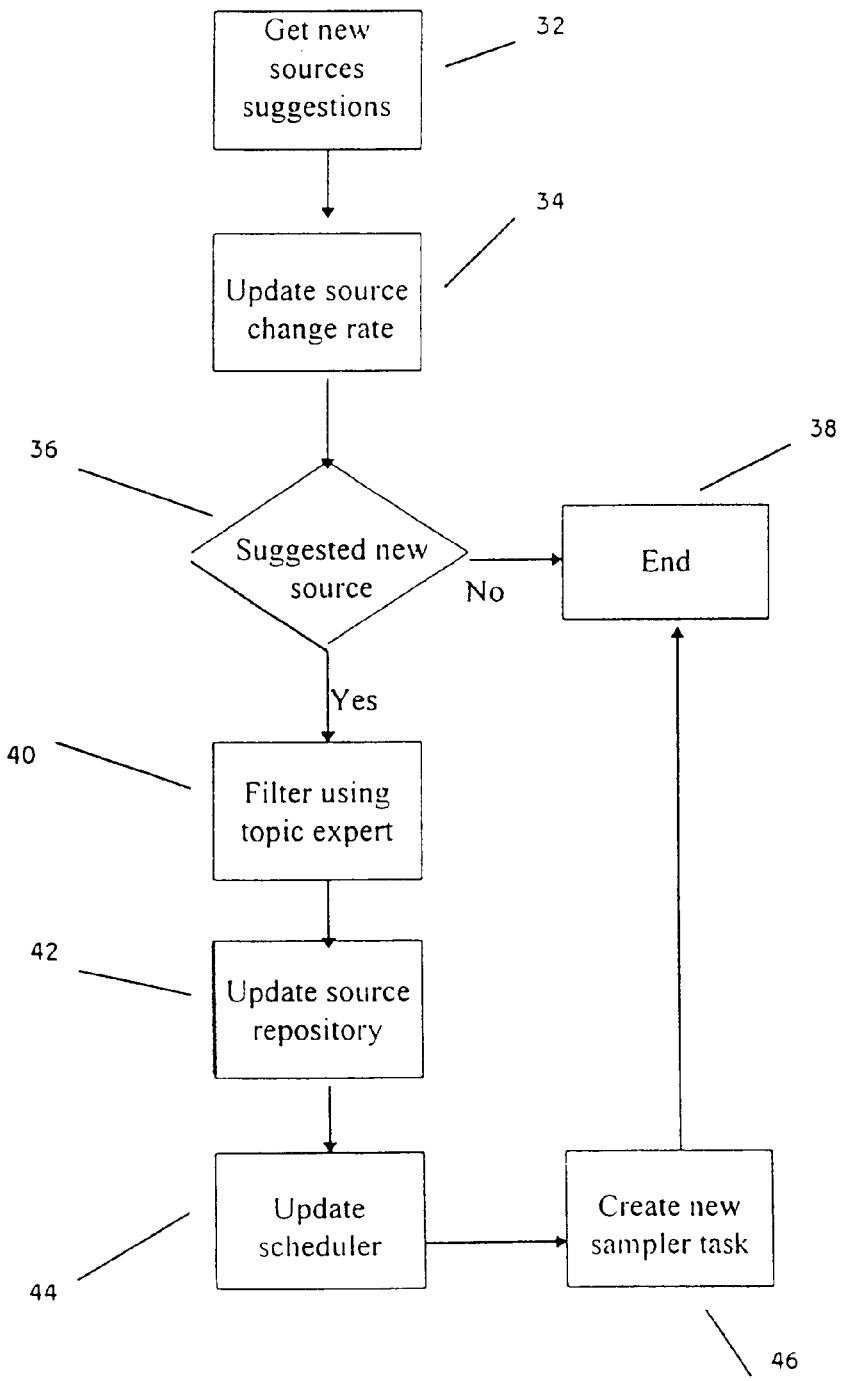
FIGS. 3A and 3B are block diagrams of exemplary methods for finding and sampling new sources of information, respectively, according to the present invention.
Figure 3B:
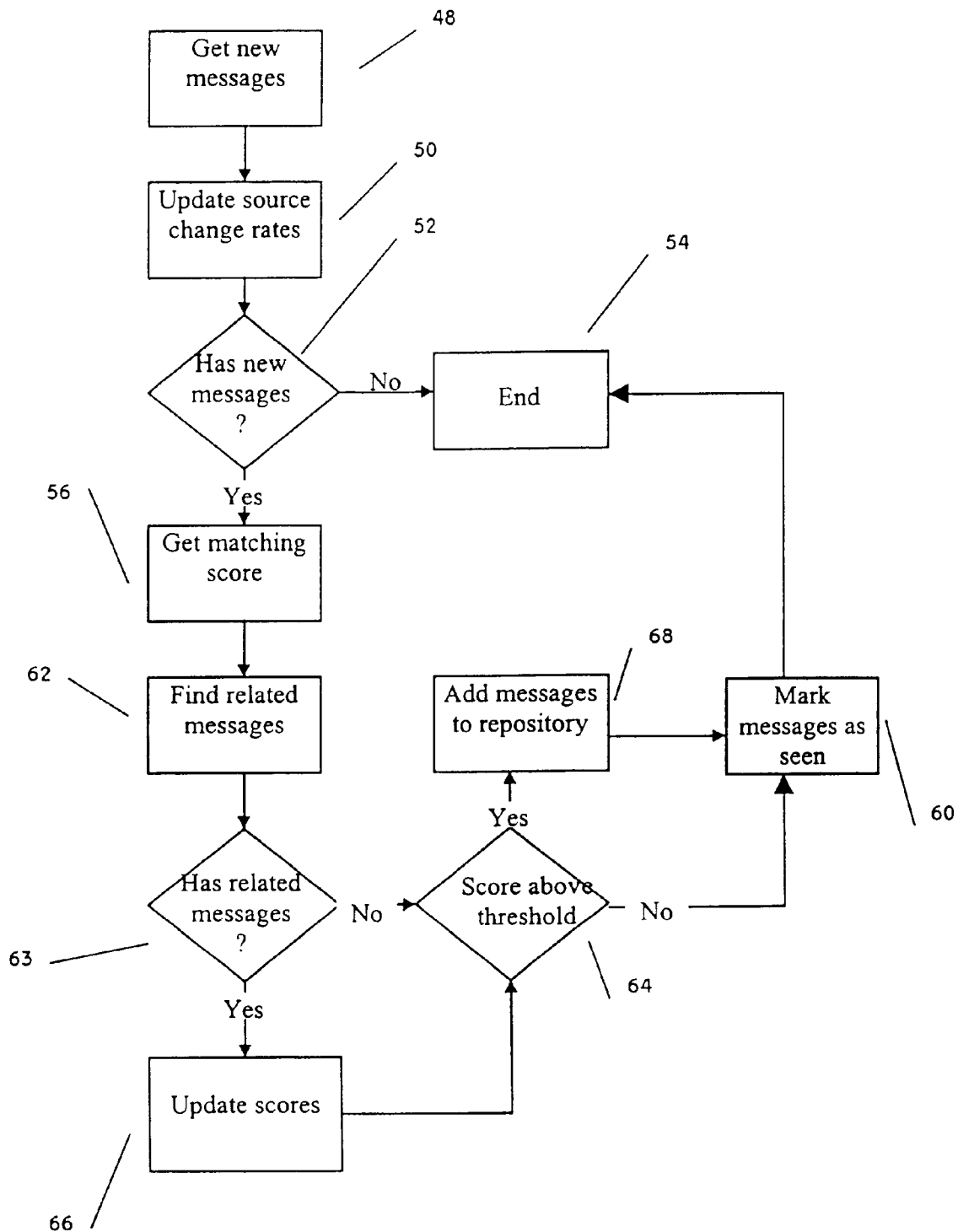

The functions of finder 22 and sampler 24 may be better understood with reference to FIGS. 3A and 3B, which are block diagrams of exemplary methods for finding and sampling new sources of information, respectively, according to the present invention. FIG. 3A shows a flow chart of the method of operation of finder 22 of FIG. 2. In the first step (block 32), finder 22 receives any suggestion for a new source of information 26. For example, such a suggestion might give the location for a potential new source of information 26, such as the URL of a Web site. These suggestions could be obtained by examining references in previously retrieved messages, by examining sources of topics related to the topic of interest, or by activating a search engine such as Yahoo™, for example. As an example, if a previous message was a Web page, a suggestion for a new source of information 26 could be obtained by following a link from the first Web page to another Web page or Web site. Preferably, the user could also suggest new sources of information 26.

In the second step (block 34), finder 22 preferably determines an initial rate of change for any suggested new source 26. Such an initial rate of change could be determined according to the type of source, such as whether new source 26 is a Web site or an electronic archive, for example. In the third step (block 36), if any new sources 26 have not been suggested, the method ends with block 38.

Otherwise, the method proceeds to the fourth step (block 40), in which new source 26 is preferably filtered using a topic expert. The topic expert is a self-operated software object which contains at least one characteristic for filtering new source 26. For example, the topic expert might accept substantially all new sources 26 which contain at least one relevant keyword used to define the topic of interest. As another example, the topic expert might reject substantially all new sources 26 which have not been updated since a certain date. As yet another example, the topic expert could incorporate one or more of these factors into a weighting function. Such a function would assign each factor a weight for evaluating new source 26, so that the characteristic for filtering new source 26 would include the factor and the weight of that factor. Many other examples of suitable topic experts could be developed by one of ordinary skill in the art.

In the next step (block 42), if new source 26 is accepted, new source 26 is placed in source repository 28. In addition, preferably the initial calculated rate of change for new source 26 is also stored in source repository 28. In the next step (block 44), scheduler 20 is informed of the addition of new source 26 to source repository 28. Scheduler 20 then creates a new sampler 24 to sample and evaluate new source 26, as shown in block 46. The method then ends with block 38.

FIG. 3B shows a flow chart of the method of operation of sampler 24 of FIG. 2. In the first step (block 48), sampler 24 samples at least one, but preferably substantially all messages from new source of information 26, as well as resamples any previously sampled sources of information 18 for at least one, but preferably substantially all new messages. Such sampling could include, but is not limited to, sampling known messages from previously sampled source of information 18; listing at least one, but preferably substantially all, of the categories of messages contained within source 18; and performing an internal search within source 18 for the desired information.

Next (block 50), sampler 24 updates the rate of change for both new source of information 26 and any other previously sampled sources of information 18. Preferably, the rate of change could be updated according to the number of new messages, for example. Also preferably, sampler 24 could determine the rate of change for source of information 18 according to a creation time of at least one message in source of information 18. Such a creation time is often found in the header of the message, for example.

For each source 18, sampler 24 then determines if there are any new messages, as shown in block 52. If there are no new messages, the method ends with block 54. Since by definition new source 26 has new messages, preferably substantially all messages are examined by proceeding to the next step.

In the next step, the matching score is obtained for each new message, as shown in block 56. Returning briefly to FIG. 2, the matching score is obtained by having sampler 24 activate a matcher 58 in order to determine the message score for a retrieved message, which reflects the relevancy and reliability of the message. The function of matcher 58 is described in further detail with regard to FIG. 4. Once the matching score has been determined, the message is marked as having been seen in block 60.

In the next step (block 62), sampler 24 searches for any previously stored messages which are related to the new message. If no related messages are found, the method proceeds to compare the matching score to the threshold (block 64). Otherwise, the matching scores are updated by matcher 58 based upon the related messages as shown in block 66 and explained in further detail with reference to FIG. 4. The method then proceeds to block 64.

Once the matching score has been compared to the threshold in block 64, the new message is added to message repository 30 with a flag to indicate that the matching score was above the minimum threshold (block 68). Otherwise, the new message is added to message repository 30 with a flag indicating that the new message was seen, but was not above the minimum threshold. Alternatively and preferably, the new message could be added to message repository 30 substantially only if the new message had a matching score above the minimum threshold. Alternatively and more preferably, message repository 30 could have a preset limit to the number of stored messages, in which case the new message would be added to message repository 30 substantially only if the new message had a matching score above the minimum threshold and if the new message had a matching score above the score of an already stored message. In that case, the already stored message would be removed from, and the new message added to, message repository 30. The method for sampler 24 then ends.

Figure 4:
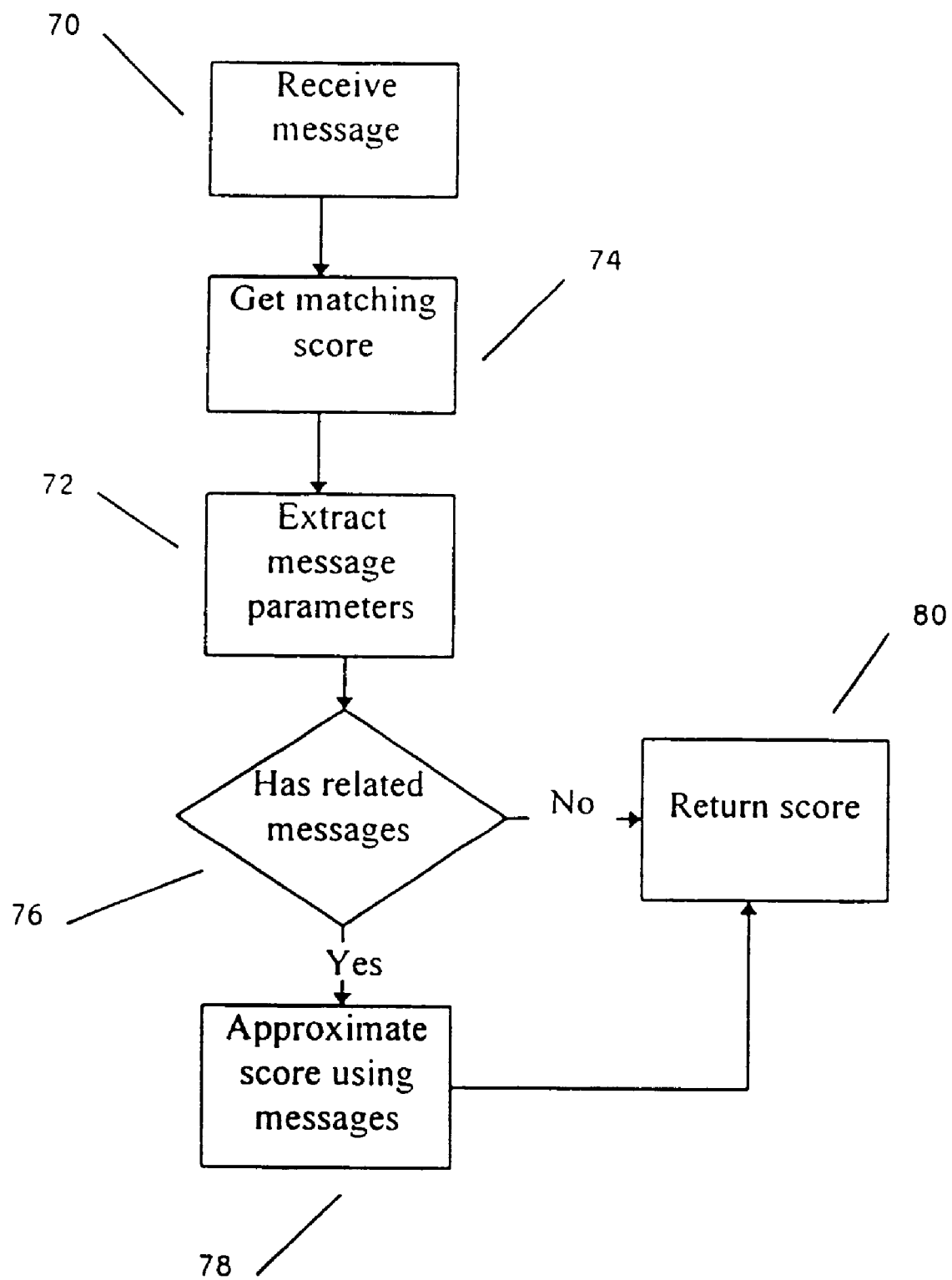
FIG. 4 is a block diagram of an exemplary scoring function according to the present invention.

The function of matcher 58 is more easily understood with reference to FIG. 4. Preferably, matcher 58 is implemented according to a number of different technologies including, but not limited to, an algorithm for calculating frequency statistics, a neural network, a pattern recognition algorithm, an image processing algorithm for either a topic related to an image or for a message containing an image, a thesaurus algorithm for determining related words or any other linguistic method for performing the functions described in greater detail as follows.

In the first step, matcher 58 receives the message to be evaluated (block 70). Next, matcher 58 extracts any desired parameters from the message (block 72). Initially, the desired parameters might include interesting or relevant fields from the message header or some general characterization of the message. Once the users have started evaluating the retrieved messages, the desired parameters could preferably be expanded to include user feedback with regard to previous messages. Such user feedback could be used to refine the desired parameters, and further specify the desired information which should be contained in the message.

Next, the simple matching score is calculated by matcher 58 according to some function, which could for example be based upon the frequency of appearance of a keyword or keywords in the message. The simple matching score is then preferably adjusted according to these parameters, and is preferably weighted (block 74). The weighting could be performed according to a weighting function, so that certain parameters would preferably be given more emphasis in the calculation of the matching score. In the next step (block 76), matcher 58 is given any related messages by sampler 24 from source repository 28 and/or message repository 30. If there is at least one related message, then the matching score is adjusted for the new message (block 78). For example, such an adjustment could be performed by comparing the parameters of the new message to parameters from previously stored messages which have been evaluated by user feedback. If a correlation is found between the parameters of the new message and those of at least one previously stored message, then the user feedback score for the at least one previously stored message is used to adjust the matching score of the new message. Also preferably, the matching score for the new message is adjusted according to the rating for the previously stored message substantially after the new message is stored in the message repository, so that stored messages can be rated again after user feedback is obtained for the message itself or for related messages.

An example of a function for adjusting the matching score would use the statistical correlation between the user feedback for a given message, preferably in the form of a quantitative value, and the at least one parameter extracted from that given message, to determine an adjustment factor for the matching score. The matching score would then be adjusted by that adjustment factor alone, or alternatively and preferably would be adjusted by the adjustment factor combined with a weight for that factor. More preferably, the weight would be determined according to the ability of user feedback for any given message to predict the user reaction to a subsequent message.

In the next step (block 80), the adjusted matching score is returned if a correlation is found. If no correlation is found, or if no related messages were found, then the matching score is returned. As noted previously, once the matching score has been calculated, the new message can be stored in message repository 30. Preferably, the new message is stored substantially only if the matching score is above a minimum threshold. Also preferably, the matching score of the retrieved message includes a relevancy score and a credibility score, the relevancy score being calculated according to a relevancy feature selected from the group consisting of a linguistic comparison between the retrieved message and the topic of interest, a user feedback and a combination of the keyword and the user feedback, and the credibility score being calculated according to the user feedback. An example of the linguistic comparison could be the comparison of a keyword related to the topic of interest to the content of the retrieved message. More preferably, the retrieved message is stored in the source repository substantially only the relevancy score is above a minimum relevancy threshold and the credibility score is above a minimum credibility threshold.

Preferably, message repository 30 stores each message with a unique message identifier, so that the message can be retrieved later if desired. In addition, message repository 30 preferably stores information concerning feedback from at least one user 31 with regard to each message and to the particular source 18 from which the message was obtained. Preferably, message repository 30 stores the creation time of the information in the message, and the retrieval time of the message. Also preferably, message repository 30 stores the score for that message given by matcher 58. Each user 31 can then access the messages from message repository 30 and provide user feedback regarding the relevancy or reliability of the information contained in these messages.

According to preferred embodiments of the present invention, each information source 18 receives a rating according to the matching score for each message obtained from that information source 18. For example, the source rating could be determined according to the number of messages from that source which have a matching score above the minimum threshold. Preferably, the source rating would be determined according to the ratio of the number of messages from that source which have a matching score above the minimum threshold, to the total number of messages from that source.

A more complicated and preferred source rating function would use the actual matching score from each message, optionally with a penalty given for messages whose scores fall below the minimum threshold, for example. The source rating for each source 18 could optionally and preferably be re-evaluated upon receipt of user feedback. Optionally and preferably, the source rating would be used to determine the minimum threshold for accepting messages from each source 18, such that a message from any source 18 with a high rating for relevance and reliability would require a lower matching score than another message from another source 18 with a lower source rating.

It will be appreciated that the above descriptions are intended only to serve as examples, and that many other embodiments are possible within the spirit and the scope of the present invention.

What is claimed:

1. An intelligent information retrieval system which identifies information relating to a plurality of different topics, the system comprising:

a first computer program coupled to source repositories, each of the plurality of topics being associated with a particular source repository, the first computer program identifying sources which may contain information relating to the plurality of topics, and modifying the source repository to which a particular topic is associated to include sources identified by the first computer program that contain information relating to the particular topic; and one or more second computer programs coupled to one or more message repositories for the plurality of topics, each of the plurality of topics being associated with a particular message repository, the one or more second computer programs identifying information at the sources included in the source repositories as relating to the topics; and storing the identified information in the message repository to which the topic is associated.

2. The intelligent information retrieval system of claim 1, wherein storing the identified information includes storing attributes about the information including relevancy of the information.

3. The intelligent information retrieval system of claim 1, wherein storing the identified information includes storing at least an identifier for irrelevant information.

4. The intelligent information retrieval system of claim 1, further comprising a schedule which specifies how the first computer program identifies sources.

5. The intelligent information retrieval system of claim 1, further comprising a schedule which specifies how the one or more second computer programs visit the sources to identify information.

6. The intelligent information retrieval system of claim 5, wherein the schedule specifies how frequently the one or more second programs visit the sources.

7. The intelligent information retrieval system of claim 1, further comprising a third computer program, the third program controlling use of the first computer program and the one or more second computer programs.

8. The intelligent information retrieval system of claim 7, wherein controlling use of the first computer program and the one or more second computer programs comprises setting resource limits on use of one or more of bandwidth, disk space, and processor time, by the first computer program and the one or more second computer programs for the plurality of different topics.

9. The intelligent information retrieval system of claim 7, wherein controlling use of the first computer program and the one or more second computer programs comprises using the source repositories and message repositories for the plurality of different topics to determine frequencies of use of the first computer program and the one or more second computer programs for the plurality of different topics.

10. The intelligent information retrieval system of claim 7, wherein the transmission is communicated over an Internet.

11. The intelligent information retrieval system of claim 1, further comprising a rating which defines a priority between the sources for the topic.

12. The intelligent information retrieval system of claim 1, further comprising functionality which compares newly identified information to a topic and stores the newly identified information if the newly identified information is determined to match the topic.

13. The intelligent information retrieval system of claim 12, further comprising functionality which compares newly identified information to information already associated with the topic and stores the newly identified information if it differs from the already stored information.

14. The intelligent information retrieval system of claim 1, further comprising a third computer program which is capable of receiving requests for information relating to a selected topic and, in response, transmitting the information relating to the selected topic stored in the associated message repository.

15. The intelligent information retrieval system of claim 1, wherein the one or more second computer programs comprises a plurality of second computer programs.

16. The intelligent information retrieval system of claim 1, wherein the system includes a plurality of second computer programs where each second computer program is associated with a different topic and each second computer program has a message repository for storing information relating to the different topic.

17. A method of providing information retrieval over a computer network, the method comprising:

receiving a first request, the first request specifying a topic;

generating a source repository comprised of a plurality of sources for the topic wherein generating a source repository is performed using identification methods which include non-keyword searching based analyses;

using the source repository to generate a message repository comprised of a plurality of information for the topic;

receiving a second request, the second request for information related to the topic; and sending at least one of the plurality of information in the message repository by the topic responsive to the second request.

18. The method of claim 17, wherein generating a source repository further comprises:

identifying a source which may contain information associated with the topic, and modifying the source repository for the topic to include the source.

19. The method of claim 17, wherein using further comprises:

taking the plurality of sources identified in the source repository for the topic, identifying information relating to the topic at each of the plurality of sources, and storing the information relating to the topic in the message repository.

20. The method of claim 19, wherein storing further comprises comparing newly identified information to the plurality of information in the message repository and storing the newly identified information if the newly identified information sufficiently matches the topic.

21. The method of claim 19, wherein comparing further comprises using a rating which defines a priority between the plurality of sources to rate the newly identified information.

22. The method of claim 19, further comprising updating a rating which defines a priority between the plurality of sources after the storing.

23. The method of claim 17, further comprising using a schedule to indicate how the sources are used.

24. The method of claim 17, further comprising using a schedule to indicate how frequently the sources are visited.

25. The method of claim 17, wherein the computer network is an Internet.

26. The method of claim 17, wherein the topic comprises a plurality of topics, the source repository comprises a plurality of source repositories each corresponding to one of the plurality of topics, and the message repository corresponds to a plurality of message repositories each corresponding to one of the plurality of topics.

27. A method of providing information retrieval over a computer network, the method comprising:

taking a plurality of source repositories, each source repository including sources relating to a particular topic and a plurality of message repositories, each message repository including information relating to a particular topic;

modifying the plurality of source repositories by identifying a source which contains information relating to a particular topic, and modifying the source repository to which the particular topic is related to include the identified source, wherein identifying is performed using identification methods which include non-keyed searching based analyses; and storing information relating to the topics by identifying information in the sources relating to the particular topics, and modifying the message repository to which the particular topic is related to include the information identified as relating to the particular topic.

28. The method of claim 27, wherein the storing further comprises comparing the identified information to the information in the message repository to which the particular topic is related and storing the identified information if the identified information sufficiently matches the topic.

29. The method of claim 27, wherein the computer network is an Internet.

30. The method of claim 27, further comprising using a schedule to indicate how frequently the storing occurs.

31. A method of identifying sources of information for a topic over a computer network, the method comprising:

taking a source repository including sources relating to a topic;

analyzing the sources in the source repository including using a plurality of non-keyword searching based analyses to identify new sources relating to the topic; and adding the new sources relating to the topic.

32. The method of claim 31, wherein at least one of the non-keyword searching based analyses includes a neural network based analysis of potential sources.

33. The method of claim 31, wherein at least one of the non-keyword searching based analyses includes a computation of a relative importance of a potential source to other sources.

\* \* \* \* \*